3,147,313
PROCESS FOR INTRODUCING PHOSPHINIC AND THIONOPHOSPHINIC ACID END GROUPS ON ALKALI TERMINATED POLYMERS
Henry L. Hsieh, Bartlesville, Okla., assignor to Phillips Petroleum Company, a corporation of Delaware
No Drawing. Filed July 13, 1959, Ser. No. 826,418
19 Claims. (Cl. 260—837)

This invention relates to polymers of increased molecular weight prepared by reacting terminally reactive polymers with organophosphonic dihalides and organothionophosphonic dihalides. In one aspect the invention relates to polymers containing phosphinic acid and thionophosphinic acid end groups. In another aspect the invention relates to solid polymers prepared by heat curing polymers obtained by reacting polymers containing terminal alkali metal atoms with organophosphonic dihalides and organothionophosphonic dihalides. In yet another aspect of the invention curing is carried out in the presence of a conventional curing system.

As used herein the term "terminally reactive polymer" designates polymer which contains a reactive group at one or both ends of the polymer chain.

It is an object of this invention to provide new and useful polymeric materials of increased molecular weight and process for their preparation.

Another object of this invention is to provide new and useful polymeric materials having phosphinic and thionophosphinic acid end groups.

Still another object of this invention is to provide self-curing polymers from polymers containing terminal alkali metal atoms, and process for their preparation.

Still another object of this invention is to provide cured polymers from polymers obtained by reacting polymers containing terminal alkali metal atoms with organophosphonic dihalides and organothionophosphonic dihalides.

These and other objects of the invention will become more readily apparent from the following detailed description and discussion.

The foregoing objects are realized broadly by reacting polymer containing terminal alkali metal atoms with a material selected from the group consisting of organophosphonic dihalides and organothionophosphonic dihalides and hydrolyzing the resulting products. The hydrolyzed polymer product can be a material of the same or increased molecular weight and will contain phosphinic acid or thionophosphinic acid end groups.

In one aspect of the invention the hydrolyzed polymer product is subjected to heat whereby molecules of said polymer react with each other to form a cured polymer.

In another aspect of the invention curing of the hydrolyzed polymer product is carried out in the presence of a conventional curing system.

The monomers which can be employed in the preparation of polymers containing terminal alkali metals include a wide variety of materials. The preferred monomers are the conjugated dienes containing from 4 to 12 carbon atoms and preferably 4 to 8 carbon atoms, such as 1,3-butadiene, isoprene, piperylene, methylpentadiene, phenylbutadiene, 3,4-dimethyl - 1,3 - hexadiene, 4.5 - diethyl-1,3-octadiene, etc. In addition, conjugated dienes containing reactive substituents along the chain can also be employed, such as for example, halogenated dienes, such as chloroprene, fluoroprene, etc. Of the conjugated dienes the preferred material is butadiene, with isoprene and piperylene also being especially suitable. In addition to the conjugated dienes other monomers which can be employed are aryl-substituted olefins, such as styrene, various alkyl styrenes, paramethoxystyrene, vinylnaphthalene, vinyltoluene, and the like; heterocyclic nitrogen-containing monomers, such as pyridine and quinoline derivatives containing at least 1 vinyl or alphamethylvinyl group, such as 2-vinylpyridine, 3-vinylpyridine, 4-vinylpyridine, 3-ethyl-5-vinylpyridine, 2-methyl - 5 - vinylpyridine, 3,5-diethyl-4-vinylpyridine, etc.; similar mono- and di-substituted alkenyl pyridines and like quinolines; acrylic acid esters, such as methyl acrylate, ethyl acrylate; alkacrylic acid esters, such as methyl methacrylate, ethyl methacrylate, propyl methacrylate, ethyl ethacrylate, butyl methacrylate; methyl vinyl ether, vinyl chloride, vinylidene chloride, vinylfuran, vinylcarbazole, vinylacetylene, etc.

The above compounds in addition to being polymerizable alone are also copolymerizable with each other and may be copolymerized to form terminally reactive polymers. In addition, copolymers can be prepared using minor amounts of copolymerizable monomers containing more than one vinylidene group such as 2,4-divinylpyridine, divinylbenzene, 2,3-divinylpyridine, 3,5-divinylpyridine, 2,4-divinyl-6-methylpyridine, 2,3-divinyl-5-ethylpyridine, and the like.

The terminally reactive polymers in addition to including homopolymers of polymerizable vinylidine compounds and copolymers of conjugated dienes with vinylidine compounds also include block copolymers, which are formed by polymerizing a monomer onto the end of a polymer, the monomer being introduced in such a manner that substantially all of the co-reacting molecules enter the polymer chain at this point. In general, the block copolymers can include combinations of homopolymers and copolymers of the materials hereinbefore set forth. A detailed description of block copolymers containing terminal reactive groups and their method of preparation is set forth in the copending application of R. P. Zelinski, Serial No. 796,277, filed March 2, 1959, now abandoned.

The terminally reactive polymers are prepared by contacting the monomer or monomers which it is desired to polymerize with an organo alkali metal compound. The organo alkali metal compounds preferably contain from 1 to 4 alkali metal atoms, and those containing 2 alkali metal atoms are more often employed. As will be explained hereinafter, lithium is the preferred alkali metal.

The organo alkali metal compounds can be prepared in several ways, for example, by replacing halogens in an organic halide with alkali metals, by direct addition of alkali metals to a double bond, or by reacting an organic halide with a suitable alkali metal compound.

The organo alkali metal compound initiates the polymerization reaction, the organo radical being incorporated in the polymer chain and the alkali metal being attached terminally at at least one end of the polymer chain. When employing polyalkali metal compounds an alkali metal is attached terminally at each end of the polymer chain. The polymers in general will be linear polymers having two ends; however, polymers containing more than two ends can be prepared within the scope of the invention. These polymers can be represented by the general formula $AY_n$ where A comprises the polymer as previously described, Y is an alkali metal and $n$ is an integer of 1 to 4. The general reaction can be illustrated graphically as follows:

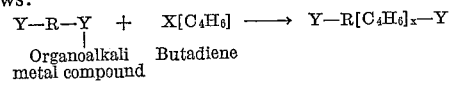

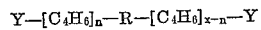

or

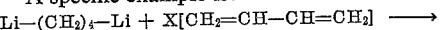

or combinations thereof.

A specific example is:

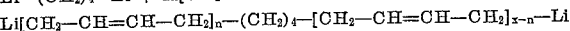

In the specific example 1,4-addition of butadiene is shown; however, it should be understood that 1,2-addition can also occur.

While organo compounds of the various alkali metals can be employed in carrying out the polymerization, by far the best results are obtained with organolithium compounds which give very high conversions to the terminally reactive polymer. With organo compounds of the other alkali metals, the amount of monoterminally reactive polymer, that is, polymer having alkali metal at only one end of the chain is substantially higher. The alkali metals, of course, include sodium, potassium, lithium, rubidium, and cesium. The organic radical of the organo alkali metal compound can be an aliphatic, cycloaliphatic or aromatic radical. For example, mono- and polyalkali metal substituted hydrocarbons can be employed including methyllithium, n-butyllithium, n-decyllithium, phenyllithium, naphthyllithium, p-tolyllithium, cyclohexyllithium, 4-butylphenylsodium, 4-cyclohexylbutylpotassium, isopropylrubidium, 4-phenylbutylcesium, 1,4-dilithiobutane, 1,5-dipotassiopentane, 1,4-disodio-2-methylbutane, 1,6-dilithiohexane, 1,10-dilithiodecane, 1,15-dipotassiopentadecane, 1,20-dilithioeicosane, 1,4-disodio-2-butene, 1,4-dilithio-2-methyl-2-butene, 1,4-dilithio-2-butene, 1,4-dipotassio-2-butene, dilithionaphthalene, disodionaphthalene, 4,4'-dilithiobiphenyl, disodiophenanthrene, dilithioanthracene, 1,2-dilithio-1,1-diphenylethane, 1,2-disodio - 1,2,3-triphenylpropane, 1,2-dilithio-1,2-diphenylethane, 1,2-dipotassiotriphenylethane, 1,2-dilithiotetraphenylethane, 1,2-dilithio-1-phenyl-1-naphthylethane, 1,2-dilithio-1,2-dinaphthylethane, 1,2 disodio - 1,1-diphenyl-2-naphthylethane, 1,2-dilithiotrinaphthylethane, 1,4-dilithiocyclohexane, 2,4-disodioethylcyclohexane, 3,5-dipotassio-n-butylcyclohexane, 1,3,5-trilithiocyclohexane, 1-lithio-4-(2-lithiomethylphenyl)butane, 1,2 - dipotassio-3-phenylpropane, 1,2-di(lithiobutyl)benzene, 1,3-dilithio-4-ethylbenzene, 1,4-dirubidiobutane, 1,8-dicesiooctane, 1,5-12-trilithiododecane, 1,4,7-trisodioheptane, 1,4-di(1,2-dilithio-2-phenylethyl)benzene, 1,2,7,8 - tetrasodionaphthalene, 1,4,7,10-tetrapotassiodecane, 1,5-dilithio-3-pentyne, 1,8-disodio-5-octyne, 1,7-dipotassio-4-heptyne, 1,10-dicesio-4-decyne, 1,11-dirubidio-5-hendecyne, 1,2-disodio-1,2-diphenylethane, dilithiophenanthrene, 1,2-dilithiotriphenylethane, 1,2-disodio-1,2-diphenylethane, dilithiomethane, 1,4-dilithio-1,1,4,4 - tetraphenylbutane, 1,4-dilithio-1,4-diphenyl-1,4-dinaphthylbutane, and the like.

While the organo alkali metal initiators in general can be employed, certain specific initiators give better results than others and are preferred in carrying out the preparation of the terminally reactive polymers. For example, of the condensed ring aromatic compounds the lithium-anthracene adduct is preferred, but the adducts of lithium with naphthalene and biphenyl can be employed with good results. Of the compounds of alkali metals with polyaryl-substituted ethylenes, the preferred material is 1,2-dilithio-1,2-diphenylethane (lithium-stilbene adduct). Ordinarily the organo dialkali metal compounds are more effective in promoting the formation of the terminally reactive polymers. The organo dialkali metal compounds which have been set forth as being preferred, are those which when prepared contain a minimum of the mono-alkali metal compound.

The amount of initiator which can be used will vary depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semi-solid and solid terminally reactive polymers can be prepared having molecular weights up to 150,000 and higher. Usually the initiator is used in amounts between about 0.25 and about 100 millimoles per 100 grams of monomer.

Formation of the terminally reactive polymers is generally carried out in the range of between —100 and +150° C., preferably between —75 and +75° C. The particular temperature employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of catalyst employed can vary but is preferably in the range of between about 1 and about 30 millimoles per 100 grams of monomers. It is preferred that the polymerization be carried out in the presence of a suitable diluent, such as benzene, toluene, cyclohexane, methylcyclohexane, xylene, n-butane, n-hexane, n-heptane, isooctane, and the like. Generally, the diluent is selected from hydrocarbons, e.g., paraffins, cycloparaffins, and aromatics containing from 4 to 10 carbon atoms per molecule. As stated previously, the organodilithium compounds are preferred as initiators in the polymerization reaction since a very large percentage of the polymer molecules formed contain two terminal reactive groups, and also the polymerization can be carried out at normal room temperatures. This is not to say, however, that other organo alkali metal initiators cannot be employed; however, usually more specialized operation or treatment is required with these materials, including low reaction temperatures. Since it is desirable to obtain a maximum yield of terminally reactive polymer, it is within the scope of the invention to use separation procedures, particularly with alkali metal initiators other than lithium compounds, to separate terminally reactive polymer from the polymer product.

The terminally reactive polymers prepared as hereinbefore described contain an alkali metal atom on at least one end of the polymer chain and the organo radical of the initiator is present in the polymer chain. These polymers can be converted to polymers containing phosphinic or thionophosphinic acid end groups by reacting or coupling the polymers with organophosphonic dihalides or organothionophosphonic dihalides. The reaction can take place whereby polymer molecules are coupled together through the dihalide in which case polymers of increased molecular weight are obtained or the reaction can occur by reaction of one molecule of dihalide with one terminal alkali metal atom whereby a polymer of the same molecular weight is obtained. In either reaction after the polymer is hydrolyzed with water a polymer product is obtained which contains phosphinic or thionophosphinic acid end groups. The following reactions in which A represents polymer illustrate the reactions which occur.

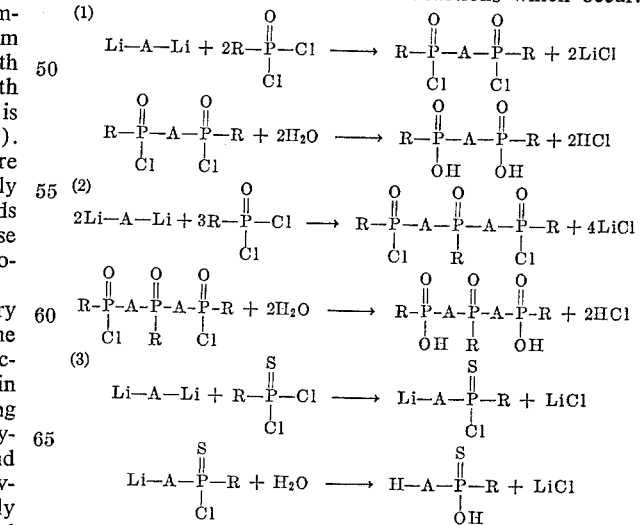

The organophosphonic dihalides and organothionophosphonic dihalides which can be employed in carrying out the invention are represented by the general formula

wherein Z is selected from the group consisting of oxygen and sulfur, X is a halogen and R is an organic radical containing up to 20 carbon atoms selected from the group consisting of substituted and non-substituted alkyl, cycloalkyl, aryl, aralkyl and alkaryl radicals. Of the halogen containing compounds those containing chlorine, bromine and iodine are preferred with the chlorine compounds being most suitable. The organic radical R can contain substituents which are inert with respect to the alkali metal atoms in the polymer, for example such groups as halogen, alkoxy, vinyloxy, tertiary amine and the like Specific organophosphonic dihalides which can be employed in carrying out the invention include the following: methylphosphonic dichloride, chloromethylphosphonic dichloride, ethoxyethylphosphonic dichloride, vinyloxymethylphosphonic dichloride, dimethylaminomethylphosphonic dichloride, ethylphosphonic dibromide, 2-chloroethylphosphonic dibromide, 2-chloroethylphosphonic dichloride, 2-bromoethylphosphonic dichloride, n-propylphosphonic dichloride, isopropylphosphonic dichloride, 1-propenylphosphonic dichloride, isobutylphosphonic dichloride, isoamylphosphonic dichloride, (1-chloro-2-methyl)butylphosphonic dichloride, (1-bromo-3-methyl)butylphosphonic dichloride, (1-chloro-1-methyl)butylphosphonic dichloride, dodecylphosphonic dichloride, eicosylphosphonic dichloride, (1,3-dichloro-5-methyl)octylphosphonic dichloride, 5,10-diethoxydecylphosphonic dichloride, (2,4-dimethyl-6-iodo)hexylphosphonic dichloride, 3-hexenylphosphonic dichloride, 2,5-difluoro-3-hexenylphosphonic dichloride, N,N-dimethylaminomethylphosphonic dichloride, N,N-diisopropylaminomethylphosphonic dibromide, 3 - (N,N - diethylamino)propylphosphonic dichloride, methylphosphonic difluoride, 2-chloroethylphosphonic difluoride, (2,4,6-trimethyl)octylphosphonic difluoride, ethylphosphonic diiodide, 1-chlorononylphosphonic diiodide, 2-vinyloxyethylphosphonic diiodide, cyclopentylphosphonic diiodide, cyclopentylphosphonic dichloride, 2-methylcyclopentylphosphonic difluoride, cyclohexylphosphonic dichloride, 3-cyclohexenylphosphonic dichloride, 2,6-dibromocyclohexylphosphonic dibromide, 4-propoxycyclohexylphosphonic dichloride, 4-(N,N-dimethylamino)cyclohexylphosphonic dichloride, phenylphosphonic dichloride, phenylphosphonic dibromide, 4-chlorophenylphosphonic dichloride, 4-bromophenylphosphonic dichloride, 4-methoxyphenylphosphonic dichloride, 4-ethoxyphenylphosphonic dichloride, 2-methylphenylphosphonic dichloride, 3-methylphenylphosphonic dichloride, 4-methylphenylphosphonic dichloride, (2-chloro-4-methyl)phenylphosphonic dichloride, 4-methylphenylphosphonic dibromide, 2,4-dimethylphenylphosphonic diiodide, 2,5-dimethylphenylphosphonic dichloride, 4-ethylphenylphosphonic dichloride, 2,4,5-trimethylphenylphosphonic dichloride, 2,4,6-trimethylphenylphosphonic dichloride, 4-isopropylphenylphosphonic dichloride, 4-benzylphenylphosphonic dichloride, 4-(2-phenylethyl)phenylphosphonic dichloride, dibenzylmethylphosphonic dichloride, 1-naphthylphosphonic dichloride, benzylphosphonic dichloride, phenylphosphonic difluoride, 2 - naphthylphosphonic diiodide, 2,4,6 - trichlorophenylphosphonic dibromide, and 4-dodecylphenylphosphonic dichloride. In general the organothionophosphonic dihalides which can be used in the invention include materials corresponding to the organophosphonic dihalides which have been listed. Typical of the organothionophosphonic dihalides are materials such as methylthionophosphonic dichloride, 2-propenylthionophosphonic dichloride, ethylthionophosphonic dibromide, chloromethylthionophosphonic dichloride, phenylthionophosphonic dibromide, and 3-methylphenylthionophosphonic dichloride. In addition to the foregoing compounds suitable organothionophosphonic dihalides are set forth in U.S. Patent 2,871,263.

In carrying out the invention the organophosphonic dihalide or organothionophosphonic dihalide is added either per se or as a solution to the unquenched polymer solution. By "unquenched polymer" is meant polymer which has not been treated with any type of reagent to inactivate the catalyst. Suitable solvents for the dihalide include materials which are employed as diluents in the preparation of the polymers containing terminal alkali metal atoms. When polymers of increased molecular weight are prepared the length of polymer chain is influenced by the amount of dihalide, by the total amount of solvent present, that is, the concentration of the polymer in the system and by the order of addition of reactants. If the dihalide is added to the polymer solution the polymer concentration with respect to the dihalide remains high and maximum coupling of polymer molecules results. If the reverse order of addition is followed, less coupling occurs; also, there is a greater tendency for the coupling reaction to occur as the amount of solvent in the system is reduced. Reaction of the dihalide with the terminally reactive polymer can be carried out over a wide range of temperature. In general, a suitable reaction temperature is from −100 to +150° C., preferably in the range of from −75 to +75° C. The particular reaction temperature employed is determined by the nature of the polymer being treated and by the dihalide compound which is used. The amount of dihalide which is provided in the reaction system will depend on the type of product desired. If the terminally reactive polymer contains two alkali metal end groups, maximum reaction or coupling of the polymer with the dihalide is obtained by providing one equivalent of halogen per equivalent of alkali metal in the polymer. An excess of dihalide will give a product which when hydrolyzed will have phosphinic acid and thionophosphinic acid end groups, while the use of less than one equivalent of halogen per equivalent of alkali metal will yield a product with alkali metal end groups prior to hydrolysis. A quantity of dihalide used is generally in the range of from 0.5 to 10 equivalents of dihalide based on 1 equivalent of the original initiator charge.

The polymer products of this invention are in some instances self-curing, that is they can be cured by heating alone without the use of auxiliary curatives. Curing occurs by reaction of reactive groups in the polymers with double bonds in the same or different polymer chains, the degree of curing being determined by the amount of reactive groups in the polymer. For example, crosslinking can occur through functional groups such as vinyloxy groups; and through reaction of the phosphonic acid and thionophosphonic acid groups with double bonds.

The following reactions are illustrative of curing:

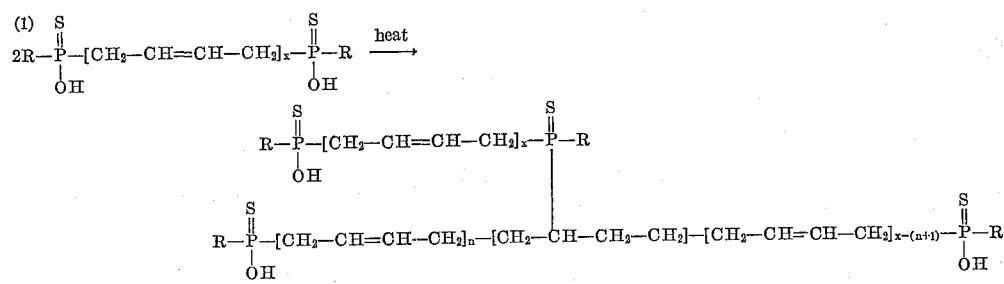

where $n$ can vary from 0 to $x-1$

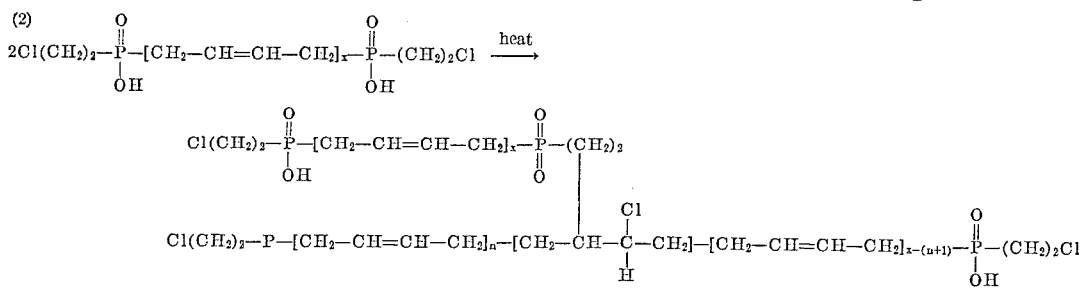

where $n$ can vary from 0 to $x-1$

The curing reaction is usually carried out by heating the polymer to temperatures in the range of between about 100 and about 500° F. and preferably between about 200 and about 400° F. The time required for curing depends on the temperature, the particular polymer being cured and the degree of curing desired. Usually curing is carried out over a period ranging from as low as 2 minutes to as high as 24 hours or higher. As desired, prior to curing polymers can be compounded with suitable reinforcing agents and fillers well known in the art, such as carbon black and mineral fillers.

In combination with heat curing it is within the scope of the invention to provide conventional auxiliary curing agents such as sulfur, oxygen, metal oxides, diisocyanates, organic peroxides and hydroperoxides, bis-azobutyronitrile and diazothioethers. Materials which are free radical generators are ordinarily regarded as being useful as curatives in the systems. Other materials well known as rubber curing agents include Santocure (N-cyclohexyl-2-benzothiazylsulfenamide), Altax (benzothiazyldisulfide), Methyl Tuads (tetramethylthiuramidisulfide), and N,N-dimethyl - S - tertiarybutylsulfenyldithiocarbamate. The auxiliary curing agents can be used when a tighter or greater degree of cure is desired than can be obtained by heat alone.

In the preferred method of this invention liquid and semi-solid polymers are converted to rubbery and plastic products and polymers which are originally rubbery or solid are further cured. When operating in accordance with the invention a wide variety of products can be obtained to give materials which are suitable as adhesives, potting compounds, as binders in castable compositions, tread stocks, and also for the manufacture of many types of molded objects. The coupled polymers adhere firmly to metals thus making them valuable in metal adhesive compositions. They can also be used in the production of laminates in which one or more plies are metal.

The following examples are presented in illustration of the invention.

*Example I*

A reactor, fitted with a condenser and stirrer and maintained under a prepurified nitrogen atmosphere, was charged with the following ingredients:

Diethyl ether, ml. _____ 1390.
Tetrahydrofuran, ml. _____ 126.
trans-Stilbene, grams _____ 54 (0.3 mole).
Lithium wire, low sodium,
  grams _____ 10.6 (1.5 gram atom).

The mixture was refluxed for 1.25 hours. A quantitative yield of 1,2-dilithio-1,2-diphenylethane was obtained.

The 1,2-dilithio-1,2-diphenylethane was used as the initiator for the polymerization of butadiene in accordance with the following recipe:

Butadiene, parts by weight _____ 100
Cyclohexane, parts by weight _____ 780
1,2-dilithio-1,2-diphenylethane, mmoles _____ 5
Temperature, ° F. _____ 122
Time, hours _____ 1
Conversion, percent _____ 91

Polymerizations were effected in 12-ounce bottles. The butadiene employed was special purity grade which was distilled and the gaseous material was dried by passing it through ethylene glycol before it was condensed. Pure grade cyclohexane was dried over silica and alumina and then bubbled in gallon lots with prepurified nitrogen for 30 minutes at the rate of 3 liters per minute. For the polymerization, cyclohexane was charged first after which prepurified nitrogen was passed through it for five minutes at the rate of 3 liters per minute. The bottle was capped and butadiene and 1,2-dilithio-1,2-diphenylethane were introduced by means of a hypodermic syringe.

After a period of one hour, one-half of the polymerization mixture was removed, quenched with water, and the polymer was coagulated with isopropanol and dried. Chloromethylphosphonic dichloride (5 millimoles, expressed in terms of the polymerization recipe) was added to the remaining unquenched polymer solution. Reaction was instantaneous. The mixture was quenched with water and the polymer was coagulated with isopropanol and dried. Inherent viscosity and gel were determined on the two products. Results were as follows:

| | Inherent viscosity [1] | Gel,[2] percent |
|---|---|---|
| Control | 0.58 | 0 |
| Treated with chloromethylphosphonic dichloride | 1.53 | 0 |

[1] One tenth gram of polymer was placed in a wire cage made from 80 mesh screen and the cage was placed in 100 ml of toluene contained in a wide-mouth, 4-ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.
[2] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, 2-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination after the cage containing the sample had stood for 24 hours in toluene, the cage was withdrawn from the bottle with the aid of forceps, and placed in the 2-ounce bottle. The same procedure was followed for determining the weight of swelled gel as was used for calibration of the cage. The weight of swelled gel was corrected by subtracting the cage calibration. The cage, after removal from the 2-ounce bottle, was placed in an aluminum weighing dish of known weight and the cage and dish were placed in a vacuum drying oven at 70–80° C. for one hour after which they were allowed to cool to room temperature and weighed. Subtracting the sum of the weights of the aluminum dish and the cage from the latter weighing gave the weight of the gel which was finally corrected for solution retention on the cage and for soluble polymer remaining within the gel structure.

These data show that a coupling reaction occurred when the polymer was treated with chloromethylphosphonic dichloride. Before coupling the product was a sticky, clear, colorless, semi-solid. The coupled product was a very tough, yellowish solid.

Example II

The 1,2-dilithio-1,2-diphenylethane employed in Example I was used as the initiator for the polymerization of butadiene in accordance with the following recipe:

| | |
|---|---|
| Butadiene, parts by weight | 100 |
| Cyclohexane, parts by weight | 1560 |
| 1,2-dilithio-1,2-diphenylethane, mmoles | 3 |
| Temperature, °F. | 122 |
| Time, hours | 1 |
| Conversion, percent | 100 |

Polymerization was effected in a quart bottle using the procedure described in Example I. At the conclusion of the polymerization, a small quantity of the reaction mixture was withdrawn, quenched with water, and the polymer was coagulated with isopropanol and dried. Chloromethylphosphonic dichloride (15 millimoles, expressed in terms of the polymerization recipe or a 3:1 mole ratio of treating agent to initiator) was added to the remaining unquenched polymer solution. The mixture was then quenched with water and the polymer was coagulated with isopropanol and dried. Data on inherent viscosity, gel, and weight percent POOH were as follows:

| | Inherent viscosity [1] | Gel,[2] percent | Weight percent POOH |
|---|---|---|---|
| Control | 1.51 | 0 | |
| Treated with chloromethylphosphonic dichloride | 2.86 | 0 | 0.11 |

[1] [2] Same as in Example I.

The increase in molecular weight (inherent viscosity measurement) by coupling was of lesser magnitude than in Example I. The quantity of coupling agent influences to some extent the molecular weight of the product. The polymer before coupling was a colorless, transparent solid. A much harder and tougher product was obtained after coupling and it had a yellowish color.

Example III

Several curing tests were made using the chloromethylphosphonic dichloride-treated polymer of Example II. Except for zinc oxide and magnesium oxide curatives which were used in excess, two drops of each curative was incorporated into 5 grams of the polymer and the compositions were heated 30 minutes at 307° F. One sample to which no curative was added was also heated under the same conditions. Results of inherent viscosity, gel, and swelling index determinations are shown below:

| Curing agent | Inherent viscosity [1] | Gel,[2] percent | Swelling Index [3] |
|---|---|---|---|
| None | 2.97 | 4 | |
| Epon 562 (A) | 2.61 | 17 | 102 |
| Hexamethylenediamine | 2.46 | 26 | 86 |
| Toluene-2,4-diisocyanate | 2.53 | 30 | 60 |
| Tri(2-methyl-1-aziridinyl)phosphine oxide | 1.65 | 66 | 23 |
| ZnO | 2.21 | 40 | 43 |
| MgO | 2.09 | 53 | 27 |

[1] [2] Same as in Example I.
[3] This determination was made along with the gel determination. Swelling index is calculated by dividing the weight of swelled gel by the weight of dry gel.
(A) Liquid aliphatic epoxide resin; molecular weight, 304; 140–165 epoxide equivalents (grams resin containing one gram equivalent of epoxide) (Shell Chemical Company).

The polymers to which curing agents were added resembled vulcanized rubbers in appearance.

Example IV 1,2-dilithio-1,2-diphenylethane, to be used as the initiator for the polymerization of butadiene, was prepared in accordance with the following recipe:

| | |
|---|---|
| trans-Stilbene, mole | .01 |
| Lithium wire, low sodium, gram atom | 0.4 |
| Diethyl ether, ml. | 500 |
| Tetrahydrofuran, ml. | 50 |
| Temperature, °F. | 122 |
| Time, hours | 1 |
| Conversion, percent | 100 |

The reaction was carried out in a quart bottle. The following recipe was used for the polymerization of butadiene:

| | |
|---|---|
| Butadiene, parts by weight | 100 |
| Cyclohexane, parts by weight | 1560 |
| 1,2-dilithio-1,2-diphenylethane, millimoles | variable |
| Temperature, °F. | 122 |
| Time, hours | 1.5 |
| Conversion, percent | 100 |

A series of runs was made using variable initiator levels. At the conclusion of each polymerization, a small portion of each reaction mixture was withdrawn, quenched with water, and the polymer was coagulated with isopropanol and dried. The remaining unquenched polymer solutions were treated with a large excess of chloromethylphosphonic dichloride (10:1 mole ratio of treating agent to initiator). Results of inherent viscosity and gel determinations are shown in the following table:

| Run No. | 1,2-dilithio-1,2-diphenylethane, mmoles | Chloromethylphosphonic dichloride, mmoles | Inherent viscosity [1] | Gel,[2] percent |
|---|---|---|---|---|
| 1 | 3 | | 1.48 | 0 |
| 1a | 3 | 30 | 2.50 | 0 |
| 2 | 5 | | 0.74 | 0 |
| 2a | 5 | 56 | 1.74 | 0 |
| 3 | 10 | | 0.41 | 0 |
| 3a | 10 | 100 | 0.80 | 0 |
| 4 | 20 | | 0.21 | 0 |
| 4a | 20 | 200 | 0.32 | 0 |
| 5 | 30 | | 0.19 | 0 |
| 5a | 30 | 300 | 0.30 | 0 |

[1] [2] Same as in Example I.

The data show that some coupling occurred even though a large excess of chloromethylphosphonic dichloride was used.

The polymers before treatment with chloromethylphosphonic dichloride ranged from viscous liquids to sticky semi-solids and solids, depending upon the inherent viscosity. After coupling, all products were tough solids, regardless of the inherent viscosity.

Tri(2-methyl-1-aziridinyl)phosphine oxide was used as a curative for the products from runs 1a and 2a. Cures were effected at two temperature levels. Two drops of the curative was incorporated into 5 grams of the polymer for each test. Results were as follows:

| Polymer from Run— | Curing temp., °F. | Curing time | Inherent viscosity [1] | Gel,[2] percent | Swelling Index [3] |
|---|---|---|---|---|---|
| 1a | 307 | 30 minutes | 2.09 | 80 | 18 |
|    | 160 | 5 days | 2.03 | 17 | 88 |
| 2a | 307 | 30 minutes | 0.80 | 68 | 20 |
|    | 160 | 5 days | | 27 | 62 |

[1] [2] Same as in Example I.
[3] Same as in Example III.

Values from the gel determinations show that the products were not well cured at the lower temperature level. The products cured at the higher temperature resembled vulcanized rubber in appearance.

Example V

The 1,2-dilithio-1,2-diphenylethane prepared in Example IV was used as the initiator for the polymerization of butadiene in accordance with the following recipe:

| | |
|---|---|
| Butadiene, parts by weight | 100 |
| Cyclohexane, parts by weight | 1560 |
| 1,2-Dilithio-1,2-diphenylethane, mmoles | 2.5 or 10 |

Temperature, °F. _____ 122
Time, hours _____ 2.5
Conversion, percent _____ 100

Polymerization was effected in quart bottles. Cyclohexane was charged first after which prepurified nitrogen was passed through it for five minutes at the rate of 3 liters per minute. The bottle was capped and the initiator was then charged by means of a hypodermic syringe followed by the butadiene charged in the same manner. A small portion of each reaction mixture was removed for control purposes. The remaining unquenched polymer solutions were treated with chloromethylphosphonic dichloride. All reaction mixtures were quenched with water, and the polymers were coagulated with isopropanol and dried. Results were as follows:

| Run No. | 1,2-dilithio-1,2-diphenylethane, mmoles | Chloromethylphosphonic dichloride, mmoles | Inherent viscosity[1] | Gel,[2] percent | ML-4[3] at 212°F. | Appearance of adduct |
|---|---|---|---|---|---|---|
| 1 | 2.5 | 50 | 1.56 | 0 | | Colorless, transparent solid. |
| 1a | 2.5 | 50 | 2.86 | 0 | 96 | Tough, yellowish solid. |
| 2 | 10 | 11 | 0.46 | 0 | | Clear, colorless liquid. |
| 2a | 10 | 11 | 0.99 | 0 | 14 | Tough, yellowish solid. |

[1][2] Same as in Example I.
[3] Was determined by ASTM D927-55T.

Several curing tests were made using the chloromethylphonic dichloride-treated polymers. Except for zinc oxide which was used in excess, 2–3 drops of curative was incorporated into the polymer and the compositions were heated 30 minutes at 307° F. One sample of each polymer to which no curative was added was also heated under the same conditions. Results of inherent viscosity, gel, and swelling index determinations are shown below:

| Curing agent | Polymer from Run 1a | | | Polymer from Run 2a | | |
|---|---|---|---|---|---|---|
| | Inherent viscosity[1] | Gel,[2] percent | Swelling Index[3] | Inherent viscosity[1] | Gel,[2] percent | Swelling Index[3] |
| None | 3.12 | 5 | 92 | 1.89 | 16 | 87 |
| Tri(2-methyl-1-aziridinyl)phosphinic oxide | 1.68 | 62 | 24 | 1.04 | 82 | 17 |
| ZnO | 2.86 | 28 | 75 | 1.41 | 49 | 50 |
| Tetraethylenepentamine | 2.67 | 23 | 97 | 0.57 | 73 | 20 |

[1][2] Same as in Example I.
[3] Same as in Example III.

The coupled products heated with curing agents resembled vulcanized rubber in apearance.

Having thus described the invention by providing specific examples thereof it is to be understood that no undue limitations or restrictions are to be drawn by reason thereof and that many variations and modifications are within the scope of the invention.

I claim:

1. A process for the preparation of polymer which comprises reacting a terminally reactive polymer having the formula $AY_n$, wherein A comprises a polymer of monomers containing a vinylidine group and selected from the group consisting of conjugated dienes containing from 4 to 12 carbon atoms, aryl-substituted olefins, heterocyclic nitrogen-containing monomers, acrylic acid esters, alkacrylic acid esters, vinylfuran and vinyl carbazole, Y is a terminally positioned alkali metal, and $n$ is an integer of 1 to 4, with a reactant material having the formula $$\overset{Z}{\underset{X}{R-P-X}}$$

wherein Z is selected from the group consisting of oxygen and sulfur, X is a halogen and R is an organic radical containing up to 20 carbon atoms selected from the group consisting of substituted and non-substituted alkyl, cycloalkyl, aryl, aralkyl and alkaryl radicals, the substituents in said radicals being selected from the group consisting of halogens, alkoxy, vinyloxy, and tertiary amines and hydrolyzing the resulting product.

2. The process of claim 1 in which the polymer is a polymer of butadiene and the reactant material is chloromethylphosphonic dichloride.

3. The process of claim 1 in which the polymer is a polymer of styrene and the reactant material is chloromethylphosphonic dichloride.

4. The process of claim 1 in which the polymer is a polymer of isoprene and the reactant material is chloromethylphosphonic dichloride.

5. The process of claim 1 in which the polymer is a copolymer of butadiene and styrene and the reactant material is chloromethylphosphonic dichloride.

6. The process of claim 1 in which the polymer is a homopolymer of butadiene and the reactant material is chloromethylphosphonic dichloride.

7. The process of claim 1 in which the polymer is a polymer of butadiene and the reactant material is chloromethylthionophosphonic dichloride.

8. A process for the preparation of solid polymer which comprises reacting terminally reactive polymer having the formula $AY_n$, wherein A comprises a polymer of monomers containing a vinylidine group and selected from the group consisting of conjugated dienes containing from 4 to 12 carbon atoms, aryl-substituted olefins, heterocyclic nitrogen-containing monomers, acrylic acid esters, alkacrylic acid esters, vinylfuran and vinyl carbazole, Y is a terminally positioned alkali metal, and $n$ is an integer of from 1 to 4, with a reactant material having the formula $$\overset{Z}{\underset{X}{R-P-X}}$$

wherein Z is selected from the group consisting of oxygen and sulfur, X is a halogen and R is an organic radical containing up to 20 carbon atoms selected from the group consisting of substituted and non-substituted alkyl, cycloalkyl, aryl, aralkyl and alkaryl radicals, the substituents in said radicals being selected from the group consisting of halogens, alkoxy, vinyloxy, and tertiary amines, hydrolyzing the resulting product and thereafter reacting molecules of said polymer at a temperature in the range of about 100 to about 500° F.

9. The process of claim 8 in which heating of the polymer is carried out in the presence of a conventional curing system.

10. A process for the preparation of solid polymer which comprises reacting a terminally reactive polymer having the formula $AY_n$, wherein A comprises a polymer of monomers containing a vinylidine group and selected from the group consisting of conjugated dienes containing from 4 to 12 carbon atoms, aryl-substituted olefins, heterocyclic nitrogen-containing monomers, acrylic acid esters, alkacrylic acid esters, vinylfuran and vinyl carbazole, Y is a terminally positioned alkali metal, and $n$ is an integer of 1 to 4, with a reactant material having the formula $$\overset{Z}{\underset{X}{R-P-X}}$$

wherein Z is selected from the group consisting of oxygen and sulfur, X is a halogen, R is an organic radical containing up to 20 carbon atoms selected from the group consisting of substituted and non-substituted alkyl, cycloalkyl, aryl, aralkyl, and alkaryl radicals, the substitutents in said radicals being selected from the group consisting of halogens, alkoxy, vinyloxy, and tertiary amines, hydrolyzing the resulting product and thereafter reacting molecules of said polymer by heating at a temperature in the range of about 100 to about 500° F. in the presence of a conventional curing system.

11. The process of claim 10 in which the polymer is a homopolymer of butadiene and the reactant material is chloromethylphosphonic dichloride.

12. The process of claim 11 in which the curing system comprises zinc oxide.

13. The process of claim 11 in which the curing system comprises magnesium oxide.

14. A process for the preparation of polymer which comprises reacting a terminally reactive polymer having the formula $AY_n$, wherein A comprises a polymer of monomers containing a vinylidine group and selected from the group consisting of conjugated dienes containing from 4 to 12 carbon atoms, aryl-substituted olefins, heterocyclic nitrogen-containing monomers, acrylic acid esters, alkacrylic acid esters, vinylfuran and vinyl carbazole, Y is a terminally positioned alkali metal, and $n$ is an integer of 1 to 4, with a reactant material having the formula

wherein Z is selected from the group consisting of oxygen and sulfur, X is a halogen and R is an organic radical containing up to 20 carbon atoms selected from the group consisting of substituted and non-substituted alkyl, cycloalkyl, aryl, aralkyl and alkarly radicals, the substituents in said radicals being inert to the alkali metal atoms in the polymer, and hydrolyzing the resulting product.

15. A process for the preparation of solid polymer which comprises reacting polybutadiene containing 1 to 4 terminal alkali metal atoms with chloromethylphosphonic dichloride and thereafter reacting molecules of the polymer by heating at a temperature in the range of about 100° to about 500° F. in the presence of liquid aliphatic epoxide resin.

16. A process for the preparation of solid polymer which comprises reacting polybutadiene containing 1 to 4 terminal alkali metal atoms with chloromethylphosphonic dichloride and thereafter reacting molecules of the polymer by heating at a temperature in the range of about 100° to about 500° F. in the presence of hexamethylenediamine.

17. A process for the preparation of solid polymer which comprises reacting polybutadiene containing 1 to 4 terminal alkali metal atoms with chloromethylphosphonic dichloride and thereafter reacting molecules of the polymer by heating at a temperature in the range of about 100° to about 500° F. in the presence of tolylene-2,4-diisocyanate.

18. A process for the preparation of solid polymer which comprises reacting polybutadiene containing 1 to 4 terminal alkali metal atoms with chloromethylphosphonic dichloride and thereafter reacting molecules of the polymer by heating at a temperature in the range of about 100° to about 500° F. in the presence of tri(2-methyl-1-aziridinyl)phosphine oxide.

19. A process for the preparation of solid polymer which comprises reacting polybutadiene containing 1 to 4 terminal alkali metal atoms with chloromethylphosphonic dichloride and thereafter reacting molecules of the polymer by heating at a temperature in the range of about 100° to about 500° F. in the presence of tetraethylenepentamine.

References Cited in the file of this patent
UNITED STATES PATENTS

| | | |
|---|---|---|
| 2,386,968 | Martin | Oct. 16, 1945 |
| 2,395,505 | Sarbach | Feb. 26, 1946 |
| 2,871,263 | Short | Jan. 27, 1959 |
| 2,911,378 | Bregman | Nov. 3, 1959 |
| 2,913,444 | Diem et al. | Nov. 17, 1959 |
| 3,008,939 | Schroeder et al. | Nov. 14, 1961 |